(12) United States Patent
Kriesel et al.

(10) Patent No.: US 10,914,087 B1
(45) Date of Patent: *Feb. 9, 2021

(54) STABILIZED AMMUNITION CONTAINER

(71) Applicant: Tak Logic LLC, Ettrick, WI (US)

(72) Inventors: Matthew Wayne Kriesel, Melrose, WI (US); Troy Bradley Goodenough, Mindoro, WI (US)

(73) Assignee: Tak Logic, LLC, Ettrick, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/732,731

(22) Filed: Dec. 22, 2017

Related U.S. Application Data

(63) Continuation-in-part of application No. 15/731,815, filed on Aug. 7, 2017, which is a continuation-in-part of application No. 14/999,722, filed on Jun. 20, 2016, now Pat. No. 10,807,767.

(60) Provisional application No. 62/231,004, filed on Jun. 22, 2015.

(51) Int. Cl.
*E04G 23/02* (2006.01)
*G06K 15/02* (2006.01)
*B32B 7/12* (2006.01)
*B41J 2/01* (2006.01)

(52) U.S. Cl.
CPC ............ *E04G 23/0214* (2013.01); *B32B 7/12* (2013.01); *E04G 23/0285* (2013.01); *G06K 15/02* (2013.01); *B41J 2/01* (2013.01)

(58) Field of Classification Search
CPC ............ E04G 23/0214; E04G 23/0285; G06K 15/02; B32B 7/12; B41J 2/01
See application file for complete search history.

(56) References Cited

U.S. PATENT DOCUMENTS

| | | | | |
|---|---|---|---|---|
| 2005/0019587 A1* | 1/2005 | Luhmann | ........... | C08G 18/4812 428/423.1 |
| 2005/0027091 A1* | 2/2005 | Luhmann | ............. | C08G 18/227 528/44 |
| 2007/0254152 A1* | 11/2007 | Schumann | ........... | C08G 18/758 428/355 N |

* cited by examiner

*Primary Examiner* — Rabon A Sergent
(74) *Attorney, Agent, or Firm* — M. Paul Hendrickson; Bryan R. Rosiejka (57) ABSTRACT

Ammunition boxes may be equipped with a cohesive and adhesive shell restraining overlay adapted to restrain ammunition shells in a stabilized position. The shell restraining overlay provides sufficient adhesiveness to restrain a housed ammunition shell at a desired shell position, but allows for relatively effortless shell release without creating excessive movement or noise. The stabilizing overlay also stabilizes the shells from inadvertent spillage from the ammunition box.

36 Claims, 3 Drawing Sheets

STABILIZED AMMUNITION CONTAINER

CROSS-REFERENCE TO RELATED APPLICATION

This application is a Continuation-in-part of U.S. Non-provisional application Ser. No. 15/731,815 filed Aug. 7, 2017 which is a Continuation-in-part of U.S. Non-provisional application Ser. No. 14/999,722 filed Jun. 20, 2016 which is a U.S. Non-provisional application of U.S. Provisional Application No. 62/231,004 filed Jun. 22, 2015, all of which applications are incorporated herein by reference in their entirety.

FIELD OF INVENTION

The present invention relates to ammunition storage containers and more particularly to stabilized ammunition storage containers.

BACKGROUND OF INVENTION

As hunting lands continue to erode and game has become scarcer, the game hunter has increasingly relied upon technological advances to enhance the chances of a successful hunt. On the other hand, hunted game are blessed with uncanny sensory abilities which are often beyond human sensory detection levels. Moreover, game animals and fowl are easily spooked by predatory motion, scents, and noises, all of which can foil hunting sites, thus destroying the hunt. Occasionally, different game species will forage together, with each species offering a particular sensing ability lacking by the other, so as to collectively provide an extraordinary sensory warning system. As a result, game hunters have increasingly relied upon technological advances to counteract the extraordinary perceptions possessed by the hunted prey.

Throughout the years, various different means for effectively transporting and using ammunition shells have been utilized. A common practice has been simply to provide the ammunition in cardboard boxes which are prone to disintegrate upon exposure to the rigors of hunting, often resulting in a noisy spillage of the shells. The audio and visual consequences of such inadvertent actions can spoil the hunt. Consequently, metal ammunition containers have become the hunter's choice. Unfortunately, the inevitable metal on metal contact created noises readily detectable by the hunted prey. With the advent of high molecular weight plastics, the use of plastic ammunition containers for transporting bulk rounds of ammunition have become a more common means of carting ammunition to the hunting site. It also has become common practice to use sound deadening dividers or liners so as to reduce noises created by the clanking of shells together within the container.

Typically, ammunition containers are provided in a variety of sizes to match different shell sizes. This is normally accomplished by at least three different container sizes (e.g. shotgun, rifle and pistol shell sized containers). The shell containers are typically designed to house a desired number of shells with dividers serving to provide different sized grids especially adapted to mate the shell size with container size. Accordingly, a group of different sized caliber shells may be housed within the same sized ammunition container. In conventional ammunition containers, this can lead to substantial head space which allows the shells to move freely within the divided cell space. This can result in an undesirable noise created by the unrestrained shells within the shell container.

There exists a need to deaden shell container noises, especially those arising while uncovering and retrieving ammunition in order to reload a firearm. The required movement necessary to open an ammunition container and retrieve shells, as well as those noises due to the opening and closing of the ammunition container, can scare the hunted game. Since the shells are customarily loosely retained within the shell container, it is desirable to lid the shells to prevent inadvertent spillage. Unfortunately, such shell toting systems have failed to overcome the inadvertent noises, movements and spillage of ammunition shells associated with conventional ammunition cases, especially those arising from the rigorous handling of ammunition cases under hunting conditions. The embodiments of the present invention adhesively restrain ammunition shells within the ammunition container, allowing the hunter to freely hunt with a field-ready ammunition source without undue concern about noises and ammunition spills, which often arise from the arduous task of retrieving ammunition. Movements and noises scaring the hunted prey are substantially mitigated. There accordingly exists a long standing need to solve the hunting problems associated with existing ammunition container technology.

SUMMARY OF THE INVENTION

The present invention solves these age old problems by providing ammunition containers equipped with a cohesive and adhesive restraining member which serves to steadfastly maintain each ammunition shell at a preset position within the ammunition container until needed. This preset adhesive shell positioning immobilizes each shell so as to effectively alleviate the deficiencies of past ammunition containers. Utilizing conventional ammunition containers, each shell may be adhesively engaged within the container by an adhesive member which steadfastly aligns and adhesively engages each shell in a field-ready position. The adhesive component possesses a unique tackiness and adhesiveness which allows for a quick shell release upon an outwardly disengaging pulling force sufficient to overcome the adhesive interaction. In order to preserve the shell in a field-ready condition, the adhesive member necessarily possesses sufficient cohesiveness so as to retain its structural integrity when separated from the adhering shell. Spooking movements and noises arising from faulty shell container construction are effectively mitigated by the adhesive member equipped ammunition shell containers of this invention. The present invention overcomes the long standing defects and provides unique ammunition container advantages and its use to the game hunter.

DETAILED DESCRIPTION

With reference to FIGS. 1-5, the present invention provides a stabilized ammunition container combination 1 comprising an ammunition container 7 equipped with a supportive base 5 (e.g. a container bed 5B) and an adhesive and cohesive overlay 3 supported by the supportive base 5 with the overlay 3 possessing sufficient adhesiveness so as to adhesively restrain an ammunition shell S emplaced thereupon and sufficient internal cohesiveness to effectively retain its structural integrity upon adhesive release of the shell S therefrom. The adhesive overlay 3 uniquely cohesively releases the shell S from its adhesive placement upon disengagement so as to render the shell substantially free from any overlay compositional residue adhering to the shell S such that the shell S is in a field-ready firing condition. The stabilizing ammunition container combination 1 may comprise a conventional ammunition container 7 equipped with latching members 7L, confining sidewalls 7S, a covering lid 7C, a lid hinge 7H, a shell divider or grid 9 and, if desired, a lock retaining member 7P.

Figure 1:
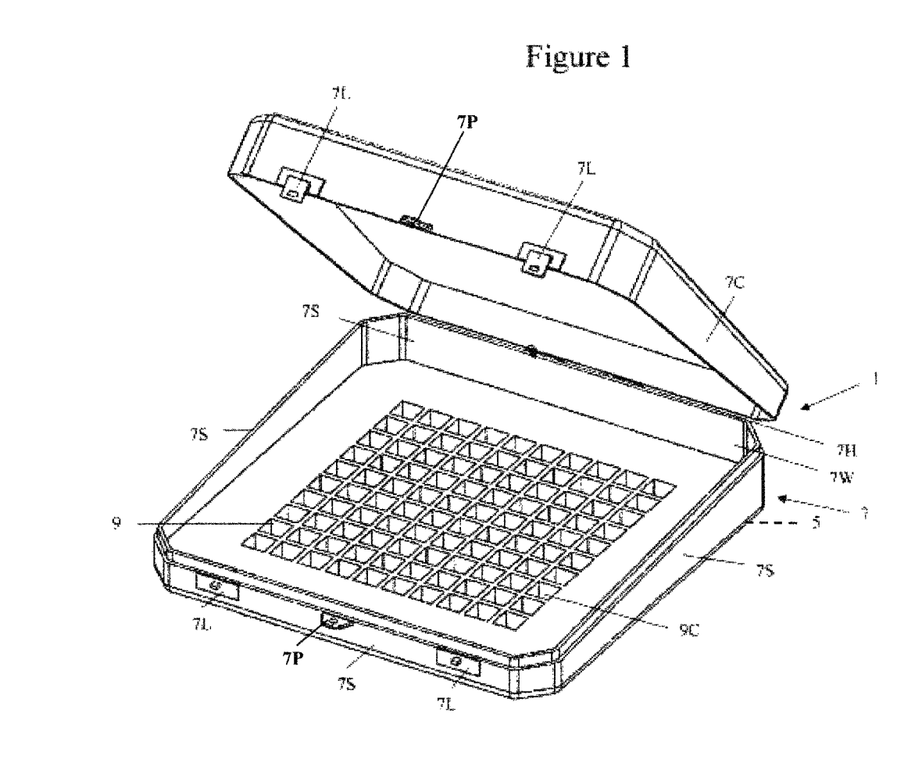
FIG. 1 is a perspective view of an open transparent ammunition box equipped with an adhesive overlay of this invention.
Figure 2:
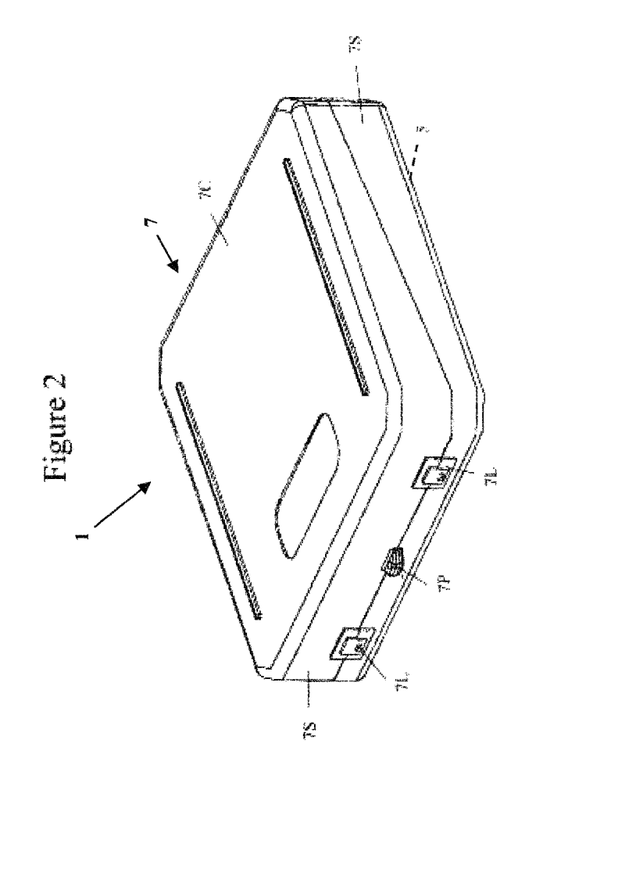
FIG. 2 is a perspective view of the ammunition box shown in FIG. 1 in a closed configuration.
Figure 3:
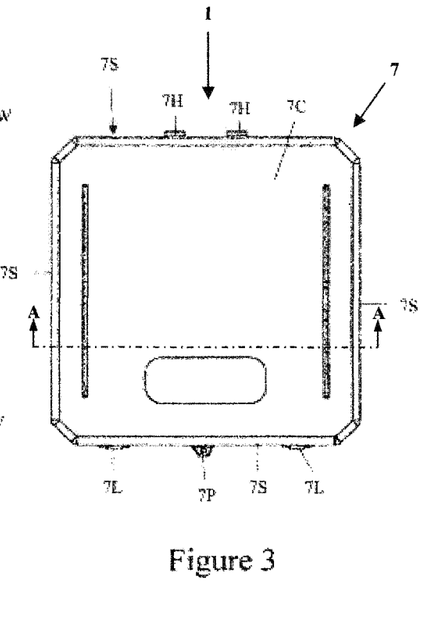
FIG. 3 is a top view of the ammunition box of FIG. 2.
Figure 4:
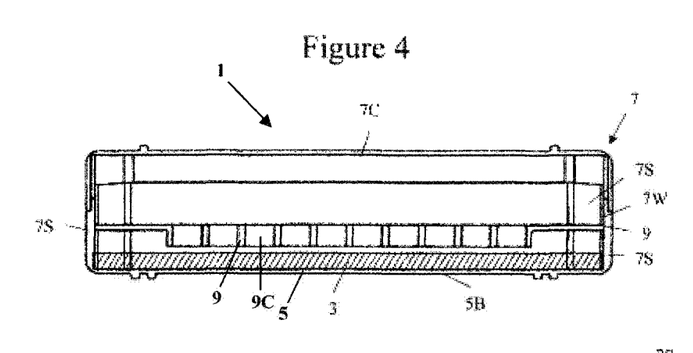
FIG. 4 is a cross-sectional view of the ammunition box of FIG. 3 taken along line A-A.
Figure 5:
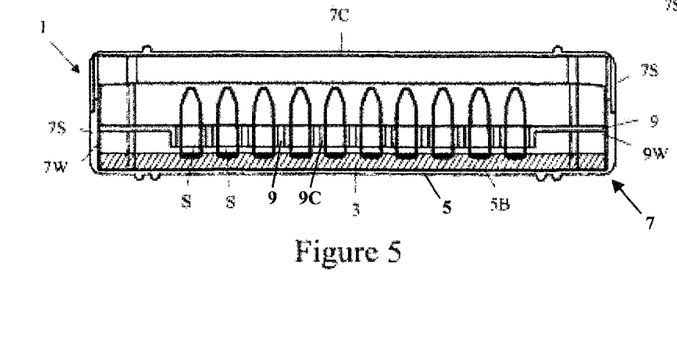
FIG. 5 depicts the cross-sectional view of FIG. 4 showing ammunition shells adhesively engaged to the adhesive overlay.

The ammunition shell stabilizing container combination 1 of this invention uniquely adhesively engages an ammunition shell S and prevents any excessive shell movement within the confines of the ammunition shell container 7 component, which as depicted by FIGS. 1, 4 and 5, may be suitably equipped with ammunition shell dividers or grids 9. The need for sound dampening pads, undo care devoted to divider grid sizes and need to design different box sizes to accommodate different sized shells are limiting factors of conventional ammunition containers which may be effectively avoided by the embodiments of the present invention. With particular reference to the FIGS. 1, 4 and 5, the use of a dividing grid 9, as well as the stabilizing overlay 3, effectively overcomes those commonly occurring field-spooking occurrences, while also providing a more universal shell box design which permits a fewer number of ammunition box sizes to universally stow and stabilize the various different ammunition shell types which are available. Thus, a single dividing grid 9 and container 7 in combination with an overlay 3 may be effectively used to adhesively house both long and short rounds of ammunition of similar caliber shells S.

In general, the stabilized ammunition shell container combination 1 of this invention, such as depicted by the Figures, comprises:

A. a supportive container base 5 (e.g., a container bed 5B) of a sufficient size and structural integrity to support a desired number of ammunition shells S, and B. a cohesive and adhesive shell stabilizing overlay 3 chemically or adhesively bonded to the container supportive base 5 with the overlay 3 being compositionally characterized as possessing sufficient adhesiveness so as to restrain the ammunition shell S at a stabilized stowable position and to release the stowed ammunition shell S by an applied counteracting force sufficient to overcome an adhesive attraction between the ammunition shell S and the adhesive stabilizing overlay 3.

The adhesive stabilizing overlay 3 will typically have an adhesion release strength of more than 300 gram force per square centimeter ($gf/cm^2$) as evidenced by an applied force which is necessarily required to separate a stowed ammunition shell S from the adhesive overlay 3. The adhesive release strength of the overlay 3 may also be effectively utilized to directly adhesively bond a cured or thermoset overlay 3 to the supportive base 5. Desirably, the overlay 3 possesses sufficient internal cohesiveness so as to separate cleanly from an attached shell S leaving no more than a minuscule amount of overlay 3 residue upon the separated shells. Thus, the adhesively disengaged shell S will be essentially free from any overlay 3 residue so as to provide the released shell S in an optimized field-ready firing condition. The ability to adhesively disengage without leaving any gun-fouling residue upon the disengaged shell is due to the innate powerful structural cohesiveness of the overlay 3.

The shell stabilizing container combination 1 shown in the Figures depicts a conventional transparent plastic ammunition box 7 suitably equipped with a supportive base 5 in the form of a container bed 5B fitted with an overlaying adhesive stabilizing overlay 3 depicted in greater detail by the cross-sectional views of FIGS. 4 and 5. The ammunition container combination 1 may suitably include a conventional ammunition container 7 appropriately equipped with an accessing hinged lid 7C, a supportive bed 5B and a gridded shell divider 9 for separating each of the individual shells S housed within the ammunition container 7. However, atypical of conventional ammunition boxes, the container combination 1 of this invention uniquely includes the cohesive and adhesive shell stabilizing overlay 3 for restraining the shell S at a stabilized and totable field-ready position.

With particular reference to FIG. 5, the stabilizing overlay 3 may be positioned as an overlaying coating or as an insertable inlay to the supportive base 5 so as to restrain an adhesively engaged shell S in a stabilized field-ready position. As particularly depicted in FIGS. 4 and 5, the ammunition box bed 5B provides a uniquely suitable supportive base 5 for the placement of the shell stabilizing overlay 3. As previously mentioned, conventional ammunition containers 7 are customarily provided with shell dividers 9 designed to matingly seat or snap onto the inner walls 7W of the ammunition box 7 so as to retain each shell S in a separate divider cell 9C. As illustrated by FIG. 5, such shell dividers 9 may be effectively combined with the adhesive overlay 3 to provide a highly stabilized ammunition container combination 1.

Since it is easier and more effective to coat or overlay the ammunition box bed 5B with the stabilizing overlay 3, the shell contacting stabilizing overlay 3 may be most suitably overlaid upon the container bed 5B before emplacing the shell dividing grid 9 within the container 7. A prefabricated overlaying adhesive insert of the stabilizing overlay 3 or a coated stabilizing overlay 3 may be suitably initially emplaced upon the container bed 5B, followed by the assemblage of the shell divider 9 within the container 7, to provide a highly stabilized ammunition box combination 1 for the seating of each shell S within each individual shell dividing cell 9C. The stabilizing overlay 3 will restrain each emplaced shell S in a stabilized position until overtly withdrawn from its original placement within the shell box combination 1. An important feature of the stabilizing overlay 3 rests upon its tenacious adhesiveness which will, upon separation from an adhesively engaged shell S, separate cleanly from the shell S (e.g. substantially free from stabilizing overlay 3 residue) so as to provide a shell S in a field-ready condition to be safely fired by a firearm. The cohesive integrity of the overlay 3 constitutes an essential prerequisite in order to properly maintain a hunting firearm in a field ready condition (i.e. via providing a detached shell S substantially free from damaging compositional residue). The adhesiveness of the overlay 3 also constitutes a particularly important consideration because ammunition container beds 5B, when used as the supportive base 5, provide a particularly suitable container placement position for the overlay 3. This placement places the shell firing pin base in direct contact with the cohesive and adhesive overlay 3. Failure of the overlay 3 to maintain cohesive integrity upon shell separation therefrom could readily lead to a clogged and fouled automatic dispensing shell feed mechanism, as well as a misfiring pin malfunction. Accordingly, it is important that the shell firing pin, upon release from the stabilizing overlay 3, remains compositionally substantially free from any overlay 3 residue.

Suitable cohesive and adhesive compositions for use as the overlaying stabilizing member 3 herein generally include viscoelastomeric compositions possessing sufficient tack and the prerequisite clean release properties for use herein. In general, the stabilizing overlay 3 will provide sufficient adhesive tack to restrain a shell S from unintended interfacial separation from the stabilizing member 3 until a sufficient separating force of at least 300 grams of force per square centimeter ($gf/cm^2$) is applied. A suitable test procedure for testing adhesive release characteristics (referenced as an adhesion release strength) is set forth in afore cited U.S. Non-provisional application Ser. No. 15/731,815.

Although the adhesive tack of the stabilizing overlay 3 may be formulated to provide varying degrees of tack (e.g. 300-2,000 or more $gf/cm^2$), it is desirable for most in-field applications that the stabilizing overlay 3 have an adhesion release strength of more than 300 $gf/cm^2$ but typically less than 1,000 $gf/cm^2$. However, within adhesion release strength values ranging from about 350 $gf/cm^2$ to less than 900 $gf/cm^2$, the stabilizing overlay 3 will generally provide sufficient stabilization against adverse ammunition shell container noises while also allowing for an expeditious one-handed shell retrieval from an open shell container. Normally, spooking events, such as excessive hunter movements in order to retrieve ammunition shells and the customary on-site noises needed to open the ammunition box for each firearm reloading, are significantly reduced to an acceptable level. The stabilizing overlay 3 is also designed to provide sufficient adhesiveness to restrain against shell spillage from the container 7 even when inadvertently dropped from elevated hunting sites. By providing a stabilizing member 3 of a desired adhesive release strength, the ammunition shells S may be easily retrieved effortlessly by a hunter from the ammunition container combination 1 without excessive strain, movement or noise. For most field ready applications, an adhesive release strength ranging from about 500 $gf/cm^2$ to about 700 $gf/cm^2$ has been found to be most satisfactory for use herein.

Whether or not a particular elastomer has sufficient tack for use herein may be preliminarily screened by placing the primer/rim base portion of a standard free-standing 9 mm pistol shell upon an adhesive elastomeric test material which is adhesively or chemically bonded to a standard ammunition box bed 5B test panel section (e.g. a high density polypropylene) and thereafter pivotally rotating the supportive base section 5 to a 90 degree pitch. Typically a potentially suitable adhesive viscoelastomeric composition for use herein will have a capacity to retain the 9 mm shell for 30 seconds or more in a perpendicular position (relative to the supportive base 5) upon a pivotal rotation thereof to a 90 degree pitch. Adhesively, the stabilizing overlay 3 should separate cleanly from the shell S without leaving more than a minuscule level of residue.

Although a useful stabilizing overlay 3 generally embraces those cohesive and adhesive elastomers possessing manual adhesive release properties as mentioned above, a particularly effective class of stabilizing overlay 3 may be derived from a thermosetting reaction media, which upon curing, yields a thermoset viscoelastomer possessing the necessary prequisite cohesiveness and adhesiveness for use herein. Exemplary of such viscoelastomeric thermosets possessing the necessary prerequisite properties for use herein are disclosed in co-pending non-provisional application Ser. No. 15/731,815 entitled Stabilized Storage Containers which application and disclosure are incorporated by reference in its entirety herein. This unique cohesive and adhesive stabilizing viscoelastomeric thermoset polymerizate, when used as a shell stabilizing member 3, is provided by a reaction media of a carefully balanced amount of polyols (e.g. triols and diols) and isocyanates (e.g., diisocyanate prepolymer) to provide a properly configured carbamate thermoset linkage or infrastructure for effectively housing a high loading of plasticizers in a viscoelastomeric form so as to provide a thermoset possessing unexpectedly unique cohesive and adhesive properties which are especially useful herein as a shell stabilizing overlay 3. The resultant thermoset reaction media provides a unique polymeric infrastructure loaded with an effective level of plastic plasticizers to create a viscoelastomeric thermoset possessing unexpectedly superior cohesiveness and adhesiveness for use as the ammunition shell stabilizing overlay 3. The adhesiveness of the thermoset viscoelastomer effectively restrains emplaced shells in a stabilized position until removed therefrom by a sufficient force to overcome the adhesive attraction between the shells S and the viscoelastomeric stabilizing overlay 3.

The disclosure of the aforementioned cited parent non-provisional application discloses a cohesive and adhesive viscoelastomeric thermoset polymerizate possessing exceptional adhesive and releasable adhesive characteristics uniquely applicable for the stabilizing use as an adhesive stabilizing overlay 3 herein. Via a meticulous control of the reaction media containing the thermosetting polymeric precursors and the plasticizer content of a precursory thermosetting reaction media, a unique viscoelastomeric thermoset overlay 3 having exceptional cohesiveness and adhesiveness for its unique use as the stabilizing overlay 3 herein may be provided.

As disclosed in the related applications incorporated herein by reference, a unique cohesive and adhesive thermoset viscoelastomeric reaction product particularly suitable for use as a stabilizing overlay 3 herein may be prepared from a thermosetting reaction media comprised of a substantially uniform admixture of an carbamate prepolymer, an effective amount of plasticizer containing less than 50% by weight of the reaction media of an epoxidized triglyceride plasticizer and from about 35% to about 55% by weight of the reaction media of polyols (typically of a molecular weight in excess of 1,000) at prescribed ratios of straight chain polyols to cross-linking polyols. The polyols as provided in the thermosetting reaction media will typically consist essentially of straight chain linking polyoxy diols and cross-linking polyoxy triols at a diols to triols weight ratio ranging from about 7:13 to about 13:7. As mentioned above, the reaction media also includes an effective amount of plasticizer sufficient to impart an adhesion release strength of more than 300 grams of force per square centimeter while retaining its desirable cohesive attributes.

A particular effective reaction media for preparing the unique cohesive and adhesive stabilizing viscoelastomeric thermoset polymerizate overlay 3 may be derived from a reaction media containing from 25% to less than 52% by weight plasticizer having an epoxidized triglyceride content of less than 50% by weight of the reaction media, from about 35% to about 55% by weight of straight chain and cross-linking polyols and from about 4% to 7% by weight of a polyurethane precursor (e.g. a polyol reacted with an isocyanate). The content and the type of polyols have been found to constitute an essential prerequisite in imparting a highly effective thermoset polymeric infrastructure for the desired unique cohesive and adhesive attributes of the stabilizing viscoelastomeric thermoset overlay 3 herein. The appropriate balance between straight chain producing diols and cross-linking polyols (e.g. triols) provides a reaction media for preparing a polyurethane reaction product (i.e. thermoset viscoelastomer) possessing the unique cohesive and adhesive compositional properties for use as a stabilizing adhesive overlay 3 herein. It has been found that when the weight ratio of diols to triols in the presence of an effective amount of plasticizer in the reaction media falls outside a weight ratio of about 7:13 to about 13:7, the resultant reaction media will generally fail to provide a desired stabilizing thermoset viscoelastomeric polymerizate having an adhesion release strength of more than 300 grams of force per square centimeter. A reaction product overlay 3 having an adhesion release strength of less than 300 grams force per centimeter square will generally fail to provide a sufficient adhesive strength to maintain an ammunition shell S in a desirable stabilized stowable form. Accordingly, the adhesiveness of the stabilizing member 3 also depends upon a proper polyol balance.

The stabilizing overlay 3 is necessarily characterized as having a capacity to adhesively restrain an ammunition shell S at a desired stabilized position upon an appropriate supportive base 5 while also allowing for a release of the shell S therefrom upon an application of an outwardly counteracting force sufficient to overcome the adhesive force binding the shell S to the overlay 3. As previously mentioned, the stabilizing overlay 3 also possesses a tenacious internal cohesiveness as evidenced by an ability to break cleanly away from its adhesive bonding to the shell S. Characteristically, upon adhesive separation, the stabilizing overlay 3 will remain substantially intact in its innate form with no more than a minuscule level of stabilizing overlay 3 polymeric residue adhering to the separated shell S. Typically, there will exist no evidence of visible overlay 3 residue upon the shell S after adhesive separation. However, to provide added protection and assurances against any stabilizing member 3 residue traces remaining with the separated shell S, the thermoset reaction media may be provided with a colorant.

The cross-linked polymeric structure resulting from the reaction media provides an ideal infrastructure for effectively harboring the plasticizer component in an unexpectedly superior cohesive and adhesive form. The plasticizer is uniformly incorporated into the reaction media containing the polymerizable thermosetting components and remains uniformly dispersed within the resultant thermoset reaction product in a highly adhesive and stabilized cohesive form. Typically, the amount of plasticizer will range from about 20% to about 55% by weight with the plasticizer being uniformly and adhesively dispersed throughout the reaction media and the resultant thermoset viscoelastomeric polymerizate. Most typically, the thermosetting reaction media will contain from about 20% to about 48% by weight plasticizer with the plasticizer content constituting from 0% to about 48% by weight of the reaction media of a triglyceride plasticizer (e.g. epoxidized triglyceride plasticizer) and from about 0% to about 40% by weight of the reaction media of an ester plasticizer, typically as a diester plasticizer. The diols and triols in cooperative combination with the plasticizer create a thermoset polymeric structure possessing a desired high degree of adhesiveness necessary to adhere an ammunition shell S thereto and to cleanly separate the shell S from the shell stabilizing overlay 3. The type of plasticizer and reactants in monitored amounts can be effectively utilized to provide the desired thermosetting and reaction product polymerizate attributes.

The diol may be typically provided by a polyether diol (typically of a molecular weight ranging from about 2,000 to about 6,000) in an amount ranging from about 10% to about 20% by weight. The diol provides a sufficient cross-linkage disruption and straight chain infrastructure to permit for an effective loading of the viscoelastomeric thermoset with a cohesive and adhesive plasticizer co-factor. The triol may be typically provided by a polyether triol (typically of a molecular weight ranging from about 3,000 to about 7,000) in an amount ranging from about 25% to about 35% by weight. The reaction media also suitably includes a polyurethane precursor typically in an amount of about 4% to 7% by weight (e.g. diisocyanate prepolymer) and from about 20% to about 48% by weight plasticizer adhesively bound within the thermoset reaction infrastructure to provide a thermoset viscoelastomeric reaction product overlay 3 having an adhesion release strength of at least 400 grams force per square centimeter.

Although the stabilizing viscoelastomeric thermoset overlay 3 will generally possess unexpectedly superior adhesiveness to effectively retain an ammunition shell S, the stabilizing overlay 3 will also possesses unexpectedly superior cohesiveness to retain its structural integrity after separation of the shell S therefrom. Upon exposure to adhesive release forces (e.g. such as pulling a shell S away from it adhesive engagement), the cohesiveness of the viscoelastomeric thermoset polymerizate overlay 3 tenaciously retains its structural integrity by separating cleanly from the shell S without leaving any adverse compositional residue upon the shell S. It has been observed that as the tack level increases, there arises an adhesive tendency to pull away from the adhesively engaged shell in a taffy-like manner until the stabilizing overlay 3 breaks cleanly away from the adhered shell S. The overall tackiness and adhesiveness of the viscoelastomeric thermoset stabilizing overlay 3 and its concomitant releasability characteristics may be altered by the compositional makeup of the thermosetting reaction media, particularly by the diol to triol weight ratio, as well as the reaction media plasticizer content and type of plasticizer. Thus, the attributes of the thermoset viscoelastomeric stabilizing overlay 3 may be tailored to meet the desired level of cohesiveness and adhesiveness for each particular shell type to be housed and adhesively engaged by the stabilized ammunition container combination 1 of this invention. Surprisingly, the internal cohesiveness of the stabilizing overlay 3 is maintained throughout an adhesion release strength range of at least 300 gf/cm$^2$ to 900 gf/cm$^2$. Typically, the higher the adhesion release strength values, such as may be utilized for heavier shells, the more the overlay 3 will tend to tenaciously cohesively string out similar to the pulling of heated candy taffy until a clean adhesive separation ultimately occurs. Comparatively higher tack levels are also prone to make it more difficult for a hunter to effectively release a shell S from the stabilizing overlay 3, such as an adhesion release strength level of greater than 800 gf/cm$^2$. From a hunter's view point, a shell release system which allows for a one-handed shell retrieval would be more desirable, which task becomes more difficult at more elevated adhesion release strength levels.

In some aspects, the viscoelastomeric stabilizing overlay 3 may be provided in the form of a prefabricated sheet or film adapted to be applied as an insertable overlay 3 to the supportive base 5. Due to its exceptional adhesive qualities, the shell stabilizing overlay 3 in the form of a prefabricated film, sheet, insert etc. will tenaciously adhere to the supportive base 5 until a sufficient counteracting force for its removal is applied. Alternatively, the reaction product may be directly bonded in situ to the supportive base 5 by applying the thermosetting reaction media to the supportive base 5 and thereafter allowing the reaction media to cure or thermoset thereupon to provide a shell stabilizing overlay 3 chemically bonded to the supportive base 5.

The thermosetting reaction media for preparing the thermoset stabilizing overlay 3 will characteristically possess film or coating forming properties during the initial thermosetting stages of the viscoelastomeric thermosetting reaction. The viscosity of the thermosetting reaction media may be suitably formulated to provide sufficient fluidity to allow for coating application or film formation under conventional thermoset molding or casting techniques. Procedurally, a measured amount of fluid thermosetting reaction media may be deposited or casted upon an ammunition container bed 5B, allowed to spread evenly (due to desirable casting viscosities) and then cured to provide the desired adhesive shell stabilizing overlay 3 tenaciously bonded thereto. Such thermosetting properties provide a convenient manufacturing procedure for preparing supportive bases 5 with the thermoset shell stabilizing overlay 3 bonded in situ thereto. Thus, conventional calendaring, casting, molding, coating, etc. film-forming techniques may be used to prepare the shell stabilizing overlay 3 in either a coated or prefabricated insertable form. Surprisingly, relatively thin films, sheets, and coatings of 25 mil thickness or less may be effectively used as an overlay 3 for certain applications. The lower thickness values (e.g. 10 mil or less) will generally depend upon its stabilized adhesiveness to the supportive base 5 and its fabricating limitations. Typically, the coated overlay 3 will range from about 30 mil to about 300 mil thickness, with a thickness of about 50 to about 200 mil being most typical for in situ coating purposes. For insertable overlays 3 (i.e. prefabricated thermoset overlays), relatively thicker overlays in a sheet form typically ranging from about 100 to about 500 mil thickness are generally more suitable. Thicker coated and prefabricated overlay inserts 3 may be used without departing from the scope of the invention, but are generally unnecessary.

By adjusting the plasticizer content and type, the characteristics of the reaction product, including the ultimate thermoset tack and initial reaction media thermosetting viscosity, may be effectively altered to suit a particular end result. For example, effective coating or casting procedurally typically requires a workable viscosity so that the desired coating or film may be produced. Effective prefabricated insertable thermoset sheets for overlay 3 insertion also depend upon a workable prefabricating viscosity. Particularly suitable for this purpose are the diester plasticizers, and especially the dialkyl esters of dicarboxylic acids, which effectively impart sufficient fluidity to provide a thermosetting reaction media which may be easily poured and molded or casted during the initial thermosetting stages. Characteristically, these dialkyl ester plasticizers are fluid at room temperature (e.g. 20° C.) and typically have a molecular weight of less than 500. Exemplary thereof are the condensation products of alcohols, such as $C_1$-$C_{10}$ alcohols and $C_2$-$C_{12}$ dicarboxylic acids, and particularly those condensates of a $C_4$-$C_8$ dicarboxylic acids and $C_2$-$C_6$ alcohols. Typically, the total plasticizer concentration will suitably range from about 20% to about 45% by weight, and most typically range from about 25% to about 40% by weight, with a weight ratio of epoxidized triglyceride plasticizer to non-epoxidized plasticizer (e.g. diester plasticizer) typically ranging from about 1:0 to about 1:3, and most typically from about 1:1 to about 3:1, when diester plasticizers are used to prepare the stabilizing overlay 3.

Since it is desirable for many applications to prepare a more fluid thermosetting reaction media, the more fluid diester plasticizers are particularly effective for this purpose. The enhanced fluidity characteristic are particularly useful in casting procedures, such as the casting of a thin film or coating (e.g. about 50 mil to 200 mil) upon the ammunition container bed 5B. Such casting techniques also tend to create a tenacious bonding between the cured stabilizing overlay 3 and the container bed 5B. Amongst the more fluid diester plasticizer are the lower dialkyl esters of dicarboxylic acids. Exemplary thereof are the dialkyl esters having alkyl groupings of less than 12 carbon atoms, and more typically of the $C_1$-$C_8$ dialkyl ester grouping of sebacates, adipates, isophthalates, phthalates, maleates, azelates, glutarates, etc. The total plasticizer concentration in such casting manufacture will most suitably range from about 20% to about 45% by weight, and most typically range from about 25% to about 40% by weight, with a weight ratio of epoxidized triglyceride plasticizer to non-epoxidized plasticizer (e.g. diester plasticizer) typically ranging from about 1:0 to about 5:1, and most typically from about 1:1 to about 3:1. Due to the availability and excellent reaction media and reaction product fabricating characteristics, dibulyl sebacate has been found to be particularly effective as a dialkyl ester plasticizer. A balanced proportion of triglyceride plasticizer and dialkyl ester plasticizer (e.g. about 1:1 to about 1:0) has generally been found to provide useful attributes in providing a desired thermosetting viscosity and reaction product (i.e. stabilizing overlay 3). On a reaction media weight basis, the dialkyl ester plasticizer content for casting purposes may desirably range from about 1% to about 20% by weight, and most typically from about 5% to about 15% by weight of the total reaction media weight.

When used as a stabilizing adhesive overlay 3 in an ammunition container bed 5B and positioned to directly contact the shell base SB, the overlay 3 will restrain the shell S at a desirable preset position. The shell S will steadfastly maintain its emplaced position without adverse or undesirable movement, notwithstanding being subsequently exposed to relatively powerful external disruptive forces. Consequently, abruptly dropping or jarring the ammunition container combination 1 will typically fail to dislodge the stabilized shell S from its mooring to the shell stabilizing overlay 3. In contrast to conventional ammunition containers which are notoriously known for a propensity to scatter shells when dropped, the ammunition container combination 1 as provided by this invention will tenaciously restrain a seated shell S under the most rigorous abusive field conditions. Thus, an inadvertent dropping of an open ammunition shell box 5 equipped with the stabilizing shell overlay 3, such as from an elevated tree stand, may occur without any shell dislodgement. Such unique features allow a hunter to use the container combination 1 in an open, field-ready position under conditions which substantially reduce any spooking movements and noises, which customarily occur during firearm shell reloading with conventional ammunition boxes.

EXAMPLE

An ammunition shell stabilizing overlay 3 was prepared from a uniformly admixed thermosetting reaction media comprising:

| | Percent by Weight: |
|---|---|
| A-Mix Ingredients: | |
| Methylene diphenyl diisocyanate based glycol prepolymer (ElastoCAST TQZP23 by BASF Corporation) | 6.46% |
| Epoxidized soybean oil plasticizer | 26.88% |
| Dibutyl sebacate plasticizer | 8.96% |
| B-Mix Ingredients: | |
| Polyether triol (ElastoCAST C-4018 by BASF Corporation) | 26.88% |
| Polyether diol (ElastoCAST C-4057 by BASF Corporation) | 29.32% |
| Catalyst (COSCAT 83 by Vertellus Holdings LLC) | 0.16% |
| Tinuvin B75 (UV inhibitor by BASF) | 1.30% |
| Dye Blend (1:1) colorant | 0.04% |
| Total | 100% |

During the initial thermosetting stages, a bed 5B of a high density polypropylene ammunition shell container 5 of the type illustrated by the Figures was uniformly coated with a 100 mil thick coating of the reaction media of this Example by casting measured amounts of the thermosetting reaction media onto the ammunition box bed 5B. The container bed 5B was preflamed to permit effective bonding of the stabilizing overlay 3 thereto. The casted coating of a flexible viscosity was allowed to fully cure to provide a thermoset viscoelastomeric shell stabilizing overlay 3 of 100 mil thickness which exhibited an adhesion release strength of 821 gf/cm$^2$ (average strength value derived from 10 tested samples).

A conventional 9 mm shell dividing grid 9 was then emplaced upon the shell stabilizing overlay 3 with each cell 9C provided by the grid 9 being thereafter loaded with a 9 mm ammunition shell S. For comparative purposes, a conventional shell box without the stabilizing overlay 3 was similarly loaded with 9 mm shells. To simulate elevated tree hunting conditions, open shell boxes with and without the stabilizing overlay 3 were dropped from a 10 foot high test site. Surprisingly, the inventive ammunition shell box combination 1 equipped with the shell stabilizing overlay 3 dropped relatively noiselessly while restraining the individual shells S substantially intact within the shell box 7 as initially loaded. In contrast, the conventional shell box without the shell stabilizing overlay 3 scattered the shells noisily throughout the drop zone.

If it is desired to increase the adhesion release strength value of the stabilizing overlay 3, a decrease in polyether triol (e.g. 24%-25%) and a corresponding polyether diol increase (e.g. 30%-31%), along with a slight increase in the diisocyanate prepolymer to compensate for the additional reactant diol concentration, will effectively accomplish an increase in the adhesion release strength value. Similarly, a decrease in adhesion release strength may correspondingly be achieved by increasing the triol and reducing the diol. It also has been observed that the thermoset polymerizate adhesiveness is somewhat dependent upon ambient temperatures. Thus, certain temperature zones may be formulated to possess a different tack level than other zones.

What is claimed is:

1. An ammunition shell container combination for restraining ammunition shells at a stabilized stowable position, said container combination comprising:
    a) a supportive base of a sufficient size and structural integrity to support the ammunition shells, and
    b) a cohesive and adhesive elastomeric stabilizing overlay bonded to the supportive base with said overlay compositionally possessing sufficient adhesiveness to restrain the ammunition shells at the stabilized stowable position and to release the ammunition shells by an applied force sufficient to overcome an adhesive attraction between an engaged ammunition shell and the stabilizing overlay, with the stabilizing overlay being either chemically bonded to the supportive base by a thermosetting bonding thereto or by an adhesive engagement of the stabilizing overlay to the supportive base.

2. The ammunition shell container combination according to claim 1 wherein the stabilizing overlay is prepared by a thermosetting reaction media comprising a substantially uniform admixture of an isocyanate precursor, about 20% to about 55% by weight of plasticizer containing less than 50% by weight of the thermosetting reaction media of an epoxidized triglyceride plasticizer, from about 35% to about 55% by weight polyols with said polyols consisting essentially of a straight chain linking diol and a cross-linking polyol at a diol to polyol weight ratio ranging from about 7:13 to about 13:7, wherein the polyols comprise repetitive oxy groups.

3. The ammunition shell container combination according to claim 2 wherein the supportive base comprises a container bed of an ammunition shell container equipped with confining sidewalls and an enclosable covering lid.

4. The ammunition shell container combination according to claim 3 wherein the stabilizing overlay comprises an insert overlay of a thickness ranging from about 50 mil to about 300 mil adhesively bonded to the bed.

5. The ammunition shell container combination according to claim 3 wherein the stabilizing overlay comprises a thermoset coating of a thickness ranging from about 25 mil to about 200 mil obtained by thermosetting the reaction media to the bed in situ.

6. The ammunition shell container combination according to claim 1 wherein the supportive base comprises the bed of an ammunition container equipped with confining sidewalls, a covering lid and a shell dividing grid, wherein the stabilizing overlay is interfacially positioned between the grid and the bed.

7. The ammunition shell container combination according to claim 6 wherein the stabilizing overlay comprises a viscoelastomeric thermoset coating having a coating thickness of at least 25 mil bonded by thermosetting the viscoelastomeric thermoset coating to the bed.

8. The ammunition shell container combination according to claim 7 further comprising a plurality of the ammunition shells adhesively engaged to the stabilizing overlay at a stabilized stowable position.

9. The ammunition shell container combination according to claim 2 wherein the reaction media comprises;
    a) about 4% to 7% by weight diisocyanate prepolymer;
    b) about 25% to about 35% by weight polyether triol as a cross-linking polyol;
    c) about 10% to about 35% by weight polyether diol as a straight chain producing diol; and
    d) about 20% to about 55% by weight plasticizer uniformly dispersed within the reaction media with the reaction media containing less than 50% by weight epoxidized triglyceride plasticizer and from 0% to about 40% by weight diester plasticizer;
    wherein the reaction media further comprises a diol to triol weight ratio of about 7:13 to about 13:7.

10. The ammunition shell container combination according to claim 9 wherein the epoxidized triglyceride plasticizer is present in an amount of about 35% to about 48% by weight of the total reaction media weight, and wherein the diol to triol weight ratio ranges from about 2:3 to about 3:2.

11. The ammunition shell container combination according to claim 9 wherein the reaction media comprises about 25% to about 40% by weight diester plasticizer.

12. The ammunition shell container combination according to claim 11 wherein the diester plasticizer comprises dibutyl sebacate.

13. The ammunition shell container combination according to claim 11 wherein the polyether triol comprises a polyoxyalkylene of a molecular weight ranging from about 3,000 to about 7,000 and wherein the polyoxyalkylene is selected from the group consisting of polyoxyethylene triol and polyoxypropylene triol.

14. The ammunition shell container combination according to claim 13 wherein the polyether diol has a molecular weight ranging from about 2,000 to about 6,000 and wherein the polyether diol is selected from the group consisting of polyoxyethylene diol and polyoxypropylene diol.

15. The ammunition shell container combination according to claim 14 wherein the supportive base comprises a bed of an ammunition box equipped with confining sidewalls and a covering lid.

16. The ammunition shell container combination according to claim 15 wherein the ammunition shell container includes an ammunition shell dividing grid resting upon the stabilizing overlay.

17. The ammunition shell container combination according to claim 16 wherein the dividing grid contains ammunition shells.

18. The ammunition shell container combination according to claim 16 wherein the adhesion separation strength of the stabilizing overlay is greater than 300 grams-force per square centimeter as determined by an applied force required to separate a circular polished nickel probe having a surface area of 1.76 $cm^2$ from the stabilizing overlay.

19. The ammunition shell container combination according to claim 18 wherein the stabilizing overlay comprises an adhesive insert adhesively affixed to the bed.

20. The ammunition shell container combination according to claim 18 wherein the stabilizing overlay comprises a thermoset coating bonded to the bed.

21. A method for manufacturing an ammunition shell stabilizing container combination adapted to restrain ammunition shells emplaced within an ammunition container comprising:
   a) providing an ammunition container equipped with a supportive base;
   b) preparing a cohesive and adhesive viscoelastomeric stabilizing overlay having a cohesive capacity to cleanly release from an ammunition shell adhesively attached thereto without leaving more than a minuscule amount of polymeric residue upon the ammunition shell upon release of the ammunition shell from the stabilizing overlay; and
   c) applying the stabilizing overlay to the supportive base, or a thermosetting reaction media precursor of the stabilizing overlay to the supportive base and curing in situ, to provide the ammunition shell stabilizing container combination.

22. The method according to claim 21 wherein the preparing comprises uniformly admixing together a thermosetting reaction media comprising:
   a) from about 4% to 7% by weight diisocyanate prepolymer;
   b) from about 10% to about 35% by weight polyether diol;
   c) from about 25% to about 35% by weight polyether triol; and
   d) from about 20% to about 55% by weight plasticizer;
   wherein the plasticizer comprises less than 50% by weight of the thermosetting reaction media of epoxidized triglyceride plasticizer and from 0% to about 40% by weight of the thermosetting reaction media of ester plasticizer; and
   wherein the thermosetting reaction media further comprises a diol to triol weight ratio of about 7:13 to about 13:7 and an epoxidized triglyceride plasticizer to ester plasticizer weight ratio of about 1:0 to about 1:3.

23. An ammunition shell container combination having a supportive base for supporting ammunition shells comprising a cohesive and adhesive viscoelastomeric overlay disposed upon the supportive base, wherein the overlay has a sufficient adhesiveness to restrain the ammunition shells at a desired stabilized position, wherein the overlay has a sufficient cohesiveness to separate from the ammunition shells without leaving more than trace amounts of the overlay upon the ammunition shells, and wherein the overlay remains bonded to the supportive base upon separation of the ammunition shells therefrom.

24. The ammunition shell container combination according to claim 23 wherein the overlay consists essentially of a thermoset viscoelastomeric reaction product.

25. The ammunition shell container combination according to claim 24 wherein the overlay is characterized as having an adhesion release strength of at least 300 gf/$cm^2$ as measured by an applied force required to separate a circular polished nickel probe having a surface area of 1.76 $cm^2$ from the overlay.

26. The ammunition shell container combination according to claim 23 wherein the overlay comprises a removable insert overlaying an ammunition box bed.

27. The ammunition shell container combination according to claim 26 wherein the combination includes a shell divider separated from the bed by the overlay.

28. A method of retrofitting a conventional ammunition container to form a stabilizing ammunition container comprising:
   a) providing an adhesive viscoelastomeric insert sized to mate onto a conventional ammunition container bed, wherein the insert has a sufficient adhesiveness to bond to the ammunition container bed, and wherein the insert has a sufficient cohesiveness so as to remain substantially intact upon an adhesive release of an attached ammunition shell from the insert, and
   b) adhesively attaching the insert to the ammunition container bed so as to provide the stabilizing ammunition container adapted to restrain ammunition shells at an emplaced position.

29. The method according to claim 28 wherein the insert comprises a thermoset viscoelastomeric polymerizate.

30. The method according to claim 28 wherein the providing of the insert further comprises protectively covering the insert with a temporary peelable covering material, and a subsequent removing of the covering material from the insert.

31. The method according to claim 28 further comprising emplacing an ammunition shell dividing grid within the ammunition container.

32. The method according to claim 31 further comprising a subsequent loading of the shell dividing grid with ammunition shells.

33. The method according to claim 29 wherein the thermoset viscoelastomeric polymerizate consists essentially of the thermoset reaction product of a reaction media comprising:
   a) from about 4% to 7% by weight diisocyanate prepolymer;
   b) from about 10% to about 35% by weight polyether diol;
   c) from about 25% to about 35% by weight polyether triol; and
   d) from about 20% to about 55% by weight plasticizer;
   wherein the plasticizer comprises less than 50% by weight of the reaction media of epoxidized triglyceride plasticizer and from 0% to about 40% by weight of the reaction media of ester plasticizer; and
   wherein the reaction media further comprises a diol to triol weight ratio of about 7:13 to about 13:7 and an epoxidized triglyceride plasticizer to ester plasticizer weight ratio of about 1:0 to about 1:3.

34. The method according to claim 33 wherein the polyether diol comprises a member selected from the group consisting of polyoxyethylene diol and polyoxypropylene diol, each having a molecular weight ranging from about 2,000 to about 6,000, and wherein the polyether triol comprises a member selected from the group consisting of polyoxyethylene triol and polyoxypropylene triol, each having a molecular weight ranging from about 3,000 to about 7,000.

35. The method according to claim 34 wherein the diol to triol weight ratio ranges from 2:3 to 3:2.

36. The method according to claim 33 wherein the insert further comprises an adhesion release strength of about 400 $gf/cm^2$ to about 800 $gf/cm^2$ as measured by an applied force required to separate a circular polished nickel probe having a surface area of 1.76 $cm^2$ from the insert.

* * * * *